United States Patent
Schroeder

[15] 3,675,702
[45] July 11, 1972

[54] PNEUMATIC TIRE CARCASS CONSTRUCTION

[72] Inventor: Charles F. Schroeder, Toledo, Ohio
[73] Assignee: Owens-Corning Fiberglas Corporation
[22] Filed: April 1, 1969
[21] Appl. No.: 811,930

[52] U.S. Cl................................152/354, 152/356, 152/359
[51] Int. Cl.......................B60c 5/00, B60c 9/06, B60c 13/00
[58] Field of Search..........................152/354, 356, 361, 355

[56] References Cited

UNITED STATES PATENTS

| | | | |
|---|---|---|---|
| 1,209,645 | 12/1916 | Price | 152/354 |
| 1,365,061 | 1/1921 | Respess | 152/355 X |
| 3,525,377 | 8/1970 | Menell et al. | 152/356 X |
| 1,461,984 | 7/1923 | Pfeiffer | 152/356 |
| 3,390,714 | 7/1968 | Marzocchi et al. | 152/356 |
| 3,467,161 | 9/1969 | Menell et al. | 152/354 |

FOREIGN PATENTS OR APPLICATIONS

| | | | |
|---|---|---|---|
| 359,917 | 4/1930 | Great Britain | 152/361 |
| 786,164 | 11/1957 | Great Britain | 152/356 |

Primary Examiner—Drayton E. Hoffman
Attorney—Staelin & Overman and Paul F. Stutz

[57] ABSTRACT

Unique carcass constructions and tires containing same, the carcass featuring variant cord angles depending upon the location of the cord in the carcass, are disclosed herein together with novel sheet-like candidate materials for carcass plies and methods of making such sheet-like materials featuring these variant angles.

9 Claims, 8 Drawing Figures

PNEUMATIC TIRE CARCASS CONSTRUCTION

The present invention relates to pneumatic tires and more particularly to a unique carcass construction and a method of making same.

Tires and, as well, many other industrial rubber products include, interiorly thereof, various textile materials as a strengthener or reinforcement. The most prominent and conventionally used textiles for this application up to the present time include cotton, rayon, the various polyamides, e.g., nylon, and the polyesters such as DACRON, Steel wire has been used in some special heavy duty applications. More recently, glass in the form of yarns, stands and cords has found some use as a tire reinforcement and, as well, a reinforcement of other industrial products.

As a candidate reinforcement for tires, glass may be considered as having a number of desirable filament properties. A glass filament possesses essentially 100 percent elasticity, demonstrates essentially no yield under stress, demonstrates excellent dimensional stability and is virtually immune to changes in atmospheric conditions; amongst which the most important are moisture and heat from the standpoint of the consideration of glass as a reinforcement for tires.

At the same time, it has been found that the mere substitution of glass filaments, or yarns and strands formed of gathered-together glass filaments, for strands, yarns and cords of the more conventional textile materials in and for reinforcement for tires and other industrial products does not yield a tire or other industrial product which is demonstrative of the improvement one might expect for the desirable properties hereinabove enumerated. The reasons for this are suspected to be quite numerous. A rational review and consideration of glass overall suggests a number of the reasons why a plain substitution of glass for the other more conventional reinforcements is not possible. Thus, glass is possessed of a considerable stiffness as compared to the other more conventional materials. The stiffness of glass is 322 grams per denier (gpd). For purposes of comparison, it may be noted that nylon has a stiffness which ranges from 18 to 23 gpd, while the polyesters range from 11 to 21 gpd, the acrylics such as ACRILAN and ORLON range from 7 to 10 gpd and viscose rayon varies from 11 to about 25 gpd. The elongation of glass at break is in the order of 3–4 percent. In contrast, the various polyesters range anywhere from 19–30 percent, the nylons range from 16–40 percent, the acrylics from 36–40 percent and viscose rayon anywhere fro 9–30 percent, depending upon the particular type and brand. Of not inconsiderable importance is the fairly high specific gravity of glass. Glass has a value of 2.54 compared to nylon's 1.14, rayon's 1.5 and polyesters such as KODEL and DACRON which range from 1.22 to 1.38. Glass is also not nearly as tough on a denier basis as the other materials. The above values illustrate a considerable variance in a number of properties which are important and have an effect on the use of glass as a reinforcement material.

Accordingly, it is an object of the present invention to provide a technique including a particular geometric, e.g., spatial, location of glass within the body as will enable the utilization or maximization of its desirable properties and a minimization of its less desirable properties which have been set forth.

It is a particular object of the present invention to provide a tire construction featuring a carcass ply structure formed of glass cords or strands so arranged as to permit the attainment of the foregoing object.

It is additionally an object of the present invention to provide a tire construction of the pneumatic type which features a plurality of carcass members which differ in terms of the cord alignment and orientation in various segments thereof.

It is also another object of the present invention to provide a novel calendered sheet good containing mutually parallel cords but of inconstant angular relationship.

It is a special object of the present invention to provide a tire construction inclusive of carcass ply cords which embody and combine features of a radial construction and at the same time features of a bias construction.

It is also an object of the present invention to provide a method and an apparatus for producing the carcass ply members featuring the variant angle reinforcing cords as described more in detail hereinafter.

It is also an object of the present invention to provide a tire which features an interior carcass reinforcement construction which is of semi-radial cord orientation whereby blurbing and/or distortion at the edge of the tire as frequently observed in radial tires is avoided.

It is still another object of the present invention to provide a tire carcass construction which features a continuous curvilinear cord having segments which define generally a bias angle in the side wall and generally a radial angle in the tread region of the tire.

It is yet another object of the present invention to provide novel methods of producing a carcass construction having the features described in the immediately preceding object.

The foregoing and, as well, other objects of the present invention will become apparent to those skilled in the art from the following detailed description taken in conjunction with the annexed sheets of drawings on which there are presented several embodiments of the present invention only in the interest of illustrating same.

Viewed most simply, the present invention envisions a tire construction in which the carcass plies individually will be composed of cords, preferably of gathered-together filaments of glass; the cords having a bias angularity in the ultimate side wall region of the tire and having radial angularity in the tread or crown region of the ultimate tire construction.

Reference may now be had to the drawings for a more detailed description and explanation of the invention herein concerned.

Figure 1:
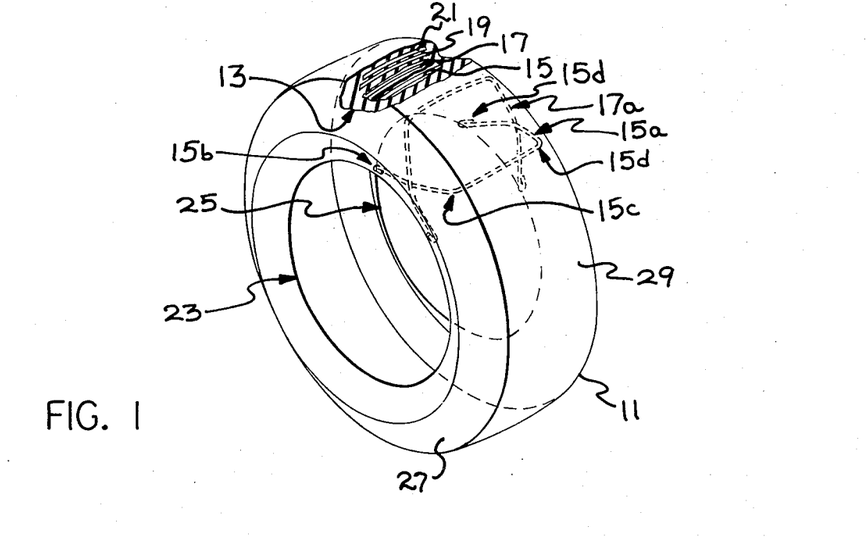
FIG. 1 is a perspective view of a tire in accordance with the present invention; parts of the tire being broken away to more clearly show the interior of the tire and parts of the carcass components being shown in dotted outline.

In FIG. 1, the tire 11 is cut away on the line 13 to reveal a lower carcass ply 15, an upper carcass ply 17, a lower belt ply or breaker strip 19 and an upper belt ply or breaker strip 21. The tire 11 includes spaced beads 23 and 25, a shoulder region 27 and a ground contacting tread 29. In accordance with the present invention, the lower carcass ply 15 is composed of a plurality of cords 15a which have their one end turned up about bead 23 as at 15b, extend at a bias angle up to the shoulder region as at 15c, thence on the shortest path directly across the tread to the opposite shoulder region as at 15d, then downwardly at the same bias angle as on the other side to the bead 23, specifically the "turn up" as at 15d.

It will be appreciated that, viewing the tire in side elevation, the side wall segments of the cord 15a, and all the other cords making up the carcass ply 15, would appear in registration, one with the other. The upper carcass ply 17 is made up of a plurality of side-by-side carcass cords (see cord 17a) which are similar to the carcass cords 15a in the lower carcass 15 excepting that the segments of the cord in the side wall region, that is, extending from the beads to the shoulder region, define an angle which is approximately equal to but opposite to the angle defined by the same segment of the cord 15a in its path from the bead to the shoulder region. The relative angularity of these ply cords in the side wall region is illustrated by the dotted line representation of these two ply cords 15a and 17a. The cords 17a (only one is shown in the interest of clarity), of which outer carcass ply 17 is composed, may be described as hoop-shaped, as reference to the drawings will reveal. It may also be noted that the side wall and tread segments of the hoop defined by cord 17a, considered together, define an imaginary plane which is oppositely inclined to the imaginary plane defined by the connected tread and side wall segments of cord 15a.

Figure 2:
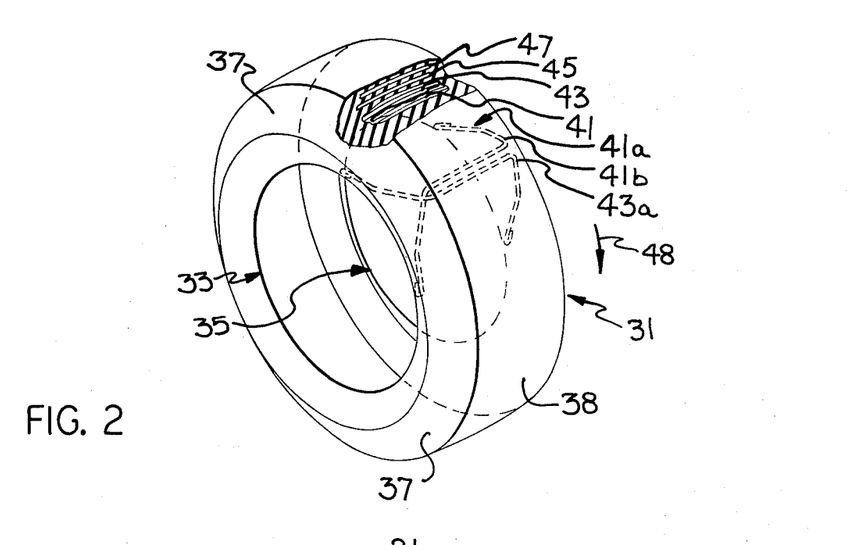
FIG. 2 is a perspective view similar to FIG. 1 illustrating a tire construction in accordance with another embodiment of the present invention.

In FIG. 2, the tire 31, which also has a segment cut away to show the interior, is composed of spaced beads 33 and 35, a connected toroidal carcass extending therefrom through shoulder region 37 and the tread region 38. The carcass is composed of a lower carcass ply 41 and an upper carcass ply 43, above which and extending from shoulder to shoulder are a pair of tread reinforcing belt plies 45 and 47.

Reference numeral 43a identifies one of the cords of which the upper or outer carcass ply 43 is composed, while reference numeral 41a identifies one of the plurality of identical cords of which the lower carcass ply 41 is composed. The cord 41a, as can be seen, has its end extremities looped around the beads 33 and 35. Commencing at the bead 35, the cord 41a proceeds up the side wall toward the shoulder at an angle, generally indicated by the direction of the arrow 48, thence from the shoulder region, identified by the reference numeral 41b, directly across the tread region of the tire to the shoulder 37 and then downwardly in an angular direction, generally indicated by the arrow 48, to the bead 33 and is wrapped thereabout. The segments of the cord 41a which reside in the side wall region are oppositely inclined, while the center segment of the cord 41a in the tread region extends in a radial manner across the tread which may be described as at a 90° angle to the peripheral center groove of the tread (not shown).

The outermost ply 43 is composed of a plurality of side-by-side cords, of which cord 43a is representative. Cord 43a is very similar to the cord 41a excepting that the segments thereof extending from the bead to the shoulder region are oppositely inclined in a given side wall. This is clearly illustrated in FIG. 2. The cords making up the carcass plies in accordance with the embodiment of FIG. 2 are not hoop-shaped and do not define an imaginary plane since the side wall segments thereof extend in opposite directions from the shoulder region of the tire.

Figure 3:
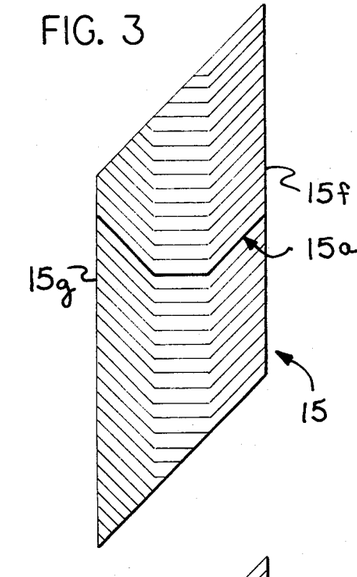
FIG. 3 is a plan view of a carcass ply having a construction in accordance with the present invention.

The carcass ply 15 is shown in lane view in FIG. 3 prior to being incorporated into the tire 11. As can be seen, a plurality of mutually parallel cords 15a, embedded in an elastomeric matrix by calendering, extend from edge 15f (ultimately forming a bead region of the tire) to the edge 15g (ultimately forming the opposite bead region). The cords extend angularly from one edge 15a to a center section (alternately lying in the tread region) where the cords change direction to extend directly thereacross and thence at a reverse angle back to the other edge. The carcass ply is bias cut, as indicated, in order that it may be incorporated onto the tire building drum in accordance with the flat band technique of tire building.

Figure 4:
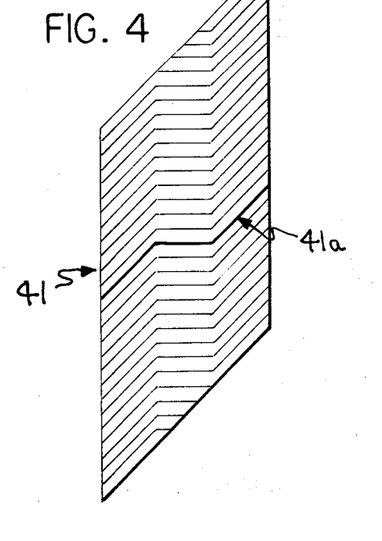
FIG. 4 is a plan view of a carcass ply illustrating another embodiment of the present invention.

The carcass ply 41 of the tire of FIG. 2 is shown in plan view in FIG. 4. As may be readily seen, the distinction between it and ply 15 resides in the fact that the cords in the side wall segment are in generally parallel relationship, whereas in the side wall regions of the carcass ply 15 the cords are not in parallel relationship.

A tire construction featuring carcass plies having the cord configuration as disclosed in FIG. 1 is preferred in accordance with the present invention. The tires illustrated in both FIGS. 1 and 2 employ two carcass plies. It is, of course, desirable under certain circumstances, and particularly in larger truck tires, to employ more than two plies in the carcass region. Tires in accordance with the present invention may embody only carcass plies of the type described or the tire may feature, in combination therewith, belt plies as illustrated in the drawings. The belt plies are desirably formed of a band of elastomeric material containing a plurality of side-by-side mutually parallel bundles of glass filaments; the belt or band being so fabricated that the bundles or cords of glass proceed in one direction in one belt ply and in an equal but opposite direction in the other belt ply.

Cords for the various carcass plies and belt plies as described hereinabove are most desirably formed of gathered-together plurality of strands, each of which is composed of either a gathered-together plurality of yarns, each of which is composed of a plurality or multiplicity of individual glass filaments, or the strands themselves may be formed of a multiplicity of individual continuous glass filaments. The number of filaments in a given cord may range from several hundred to several thousand in number. A particular attribute of a tire constructed in accordance with the present invention resides in the improved rolling stability by reason of the inclination of the multiplicity of cords directly across the tread in the radial direction coupled with the bias angularity of the same cords in the side wall regions of the tire. The foregoing, in combination with tread reinforcing belts fabricated of glass cords, lends a unique stability of the tire tread in terms of resistance to squirming and movement under cornering and braking service conditions.

It is a significant feature of the tire construction of the present invention that they do not exhibit the troublesome phenomenon of blurbing and edge distortion which is exhibited by the conventional radial tire. In the radial tire, the cords of the principal carcass ply extend in the shortest path from the bead to the adjacent shoulder, thence across the crown and thence in the opposite side wall in the shortest path to the opposite bead. The cord ends are thus directly across from each other in the bead region. Viewed in another way, the individual cords define a loop which is the shortest possible in a given tire size. By reason of this structure, it is believed that under dynamic conditions, e.g., under load and rolling, the cords in the shoulder and side wall are placed in compression as the tire rotates, specifically as the given cord is deflected during its passage through that arc of rotation in which the segment of the tire is in contact with the road.

With the construction of the present invention, any given cord end is anchored in the bead at a point which is angularly displaced from the central portion of the cord which is being exposed to the forces generated as the tread region (in which the central portion is located) is experiencing deflection in passing in load-bearing contact with the road. Consequently, the cord being deflected in the tread and shoulder region does not transmit this compressive force directly to the remainder of the cord as in the case of a fully radial cord, but rather such forces have an opportunity for dissipation or absorption due to the angular orientation of the cord in the side wall region. The angularly disposed cord (taken with reference to a radial cord) is, of course, embedded in a matrix of rubber which is supporting the cord along its greater length as compared to the radial cord.

Figure 5:
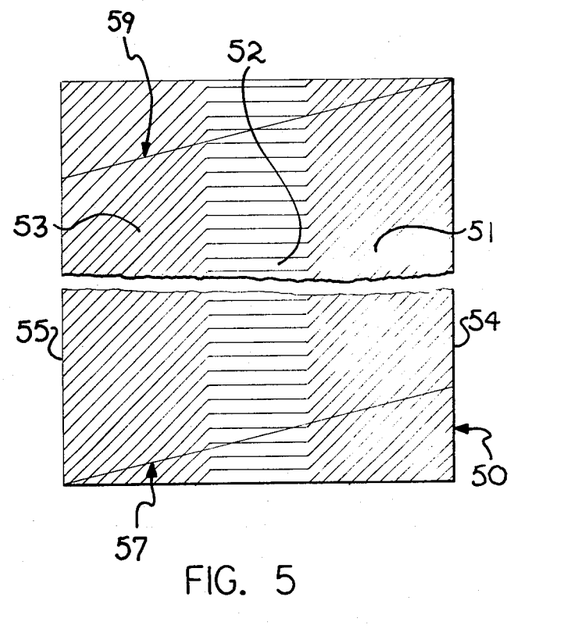
FIG. 5 is a plan view of an elongate sheet material illustrating the formation of a carcass ply.

Reference to FIG. 5 reveals a segment of an elongate vulcanizable strip material identified by the reference numeral 50. As can be seen, the elongate strip material includes three serially connected segments 51, 52 and 53; all of which contain within the segment mutually parallel cords which, however, proceed collectively in different directions in the three segments. The cords within the segment 52 which corresponds to the ultimate tread region of the ply extend in horizontal direction which conforms to a 90° or radial angle and which at the same time is in the plan view perpendicular to the bead regions of the tire which are represented by the edges 54 and 55. Lines 57 and 59 identify the bias cutting of the elongate strip as to yield a carcass ply adapted for incorporation into the "flat band" tire building operation. The latter being well understood in the art, it will not be described in detail herein.

The carcass plies as illustrated in FIGS. 3, 4 and 5 and featuring variant cord angles can be produced by employment of a suitable jig. Thus, a sheet in which the cords are of uniform parallel orientation is located in an arrangement provided with appropriate means controlled to grip the sheet and also with auxiliary means suitably movable to shift the parallel cords into the orientation as shown in any of FIGS. 3 to 5.

Naturally, the selection of the precise angle in the various segments of the carcass ply is, in part, dependent upon the particular tire size, the characteristics, e.g., toughness and/or plasticity, of the particular rubber stock and the amount of pantographing which will occur as the band is expanded to final tire configuration during the Bagomatic cure cycle. Thus, it is known that the "green" angle described by a given tire cord, that is, the angle of the cord considered in its position on the tire building drum (before vulcanization), will not necessarily be the same as the "cured" angle, that is, the angle of the cord taken with reference to a reference point, usually the peripheral centerline, after the "green" tire has been expanded into the mold in the vulcanization process, usually in the referred-to "Bagomatic" curing process. Thus, the "green" tire which may be described as approximating the configuration of a beer barrel is in an unvulcanized state. In the vulcanizing operation, during which the beer barrel configuration is converted into the conventional tire configuration, the "green" beer barrel shaped member is placed in a lower mold half, defining one-half of the tire. At the same time, an expandable casing approximating an inner tube is located inside of the beer barrel. Thus, it is expanded by steam pressure pushing the central region of the beer barrel shaped member outwardly as an upper mold half descends, closing the mold. The inner casing approximating an inner tube thus pushes the "green" tire component radially outwardly whereby the outer exterior thereof takes on the side wall and tread configuration which is defined by the interior surface of the tire mold halves. Thereafter, of course, the tire is removed after appropriate heat conditioning. Since the end extremities of the given cords of the carcass plies are held relatively immobile in the bead region, the cords in extending through the side wall region, the tread region and the opposite side wall region experience some realignment. Obviously, this shift in "green" angle to "cure" angle is a predetermined factor or can be determined with limited trial and can be taken into account in choosing the appropriate angles in the segments of the carcass plies. For purposes of simplicity, the cord angles in the bias plies as illustrated in FIGS. 3, 4 and 5 have been represented as the ultimate desired. Thus, it can be seen that in the tread segment the cords proceed diametrically across the tread in a radial direction. As indicated, the actual "green" angle of this cord in this segment may not be exactly diametrically across since the cord may experience some shift due to the pantographing of the cords.

Figure 6:
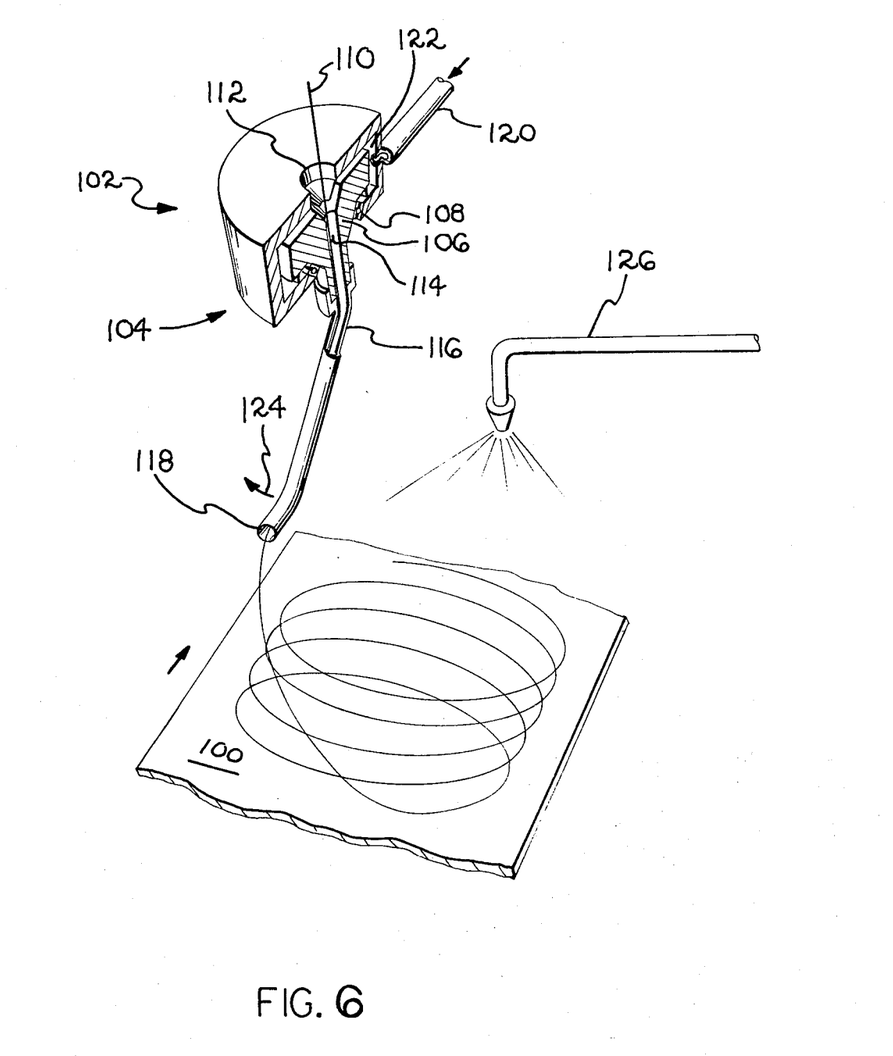
FIG. 6 is a schematic perspective view of apparatus in operation producing a mat-like structure of utility as a component of a carcass construction for a tire.
Figure 7:
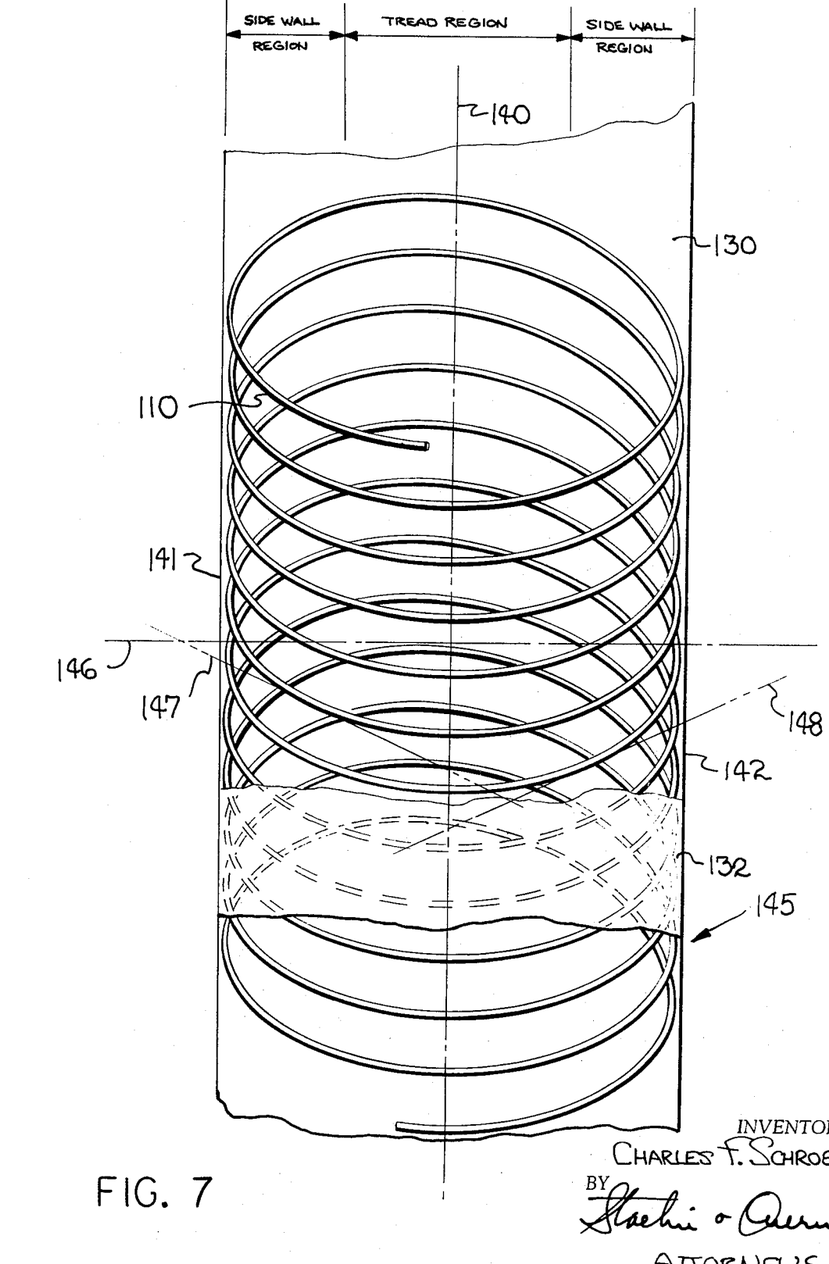
FIG. 7 is a plan view of an elongate sheet with a portion broken away to show an interiorly disposed continuous cord arranged in repeating loops schematically illustrating the arrangement of the segments of the loop in different regions of a carcass ply into which the sheet may be divided for use as a tire body member.

Reference may now be had to FIGS. 6 and 7 wherein further embodiments of the present invention are illustrated. FIG. 6 illustrates apparatus and method for producing an essentially nonwoven mat of continuous strand material disposed in a manner as provides, when incorporated into a rubber matrix, an elongate sheet of utility in forming a carcass ply characterized principally by an interior cord or strand angle which is of preselected variable angle. The angle of the strand material can be controlled, in a manner to be described, as to yield in the carcass a strand angle which in the ultimate tread region of the tire, in which the carcass is incorporated, will be generally radial while the angle of the cord, generally in the region of the carcass which essentially constitutes the side wall region of the tire in which ultimately incorporated, will be generally angular or of bias inclination.

As indicated, the apparatus and method is schematically illustrated in FIG. 6. A conveyor 100 is controlled to pass beneath an overhead dispenser 102. The dispenser comprises an outer housing 104 which is generally hollow and contains therewithin a member 106 mounted on bearings 108 in a manner as to be rotatable. The cord or strand 110 passes vertically downwardly through an entry aperture 112 in the housing 104, through a tubular passageway 114 in the rotating member 106 to the dispenser tube 116 mounted at the bottom thereof. The latter proceeds downwardly and then at an angle terminating in an outlet end 118. A lateral tube 120 connects with the housing 104 and a suitable opening connects this tube fluidly with the passageway 122. A fluid medium such as air is introduced through the tube 120, passes through the passageway 122, thence down through the passageway 114 through the lower dispenser tube 116 and out the outlet 118 carrying the strand material with it. At the same time, the member 106 is rotated, causing the outlet tube 116 to move in a circular path as indicated by the arrow 124. The rotation of the member 106 and tube 116, the velocity of the air and the linear movement of the conveyor are controlled in such manner that the strand or cable 110 is deposited upon the conveyor in a series of overlapping loops as schematically illustrated. Since there are a number of arrangements, mechanical and otherwise, that may be employed in moving the conveyor, rotating the member 106 and propelling or imparting motion to the propellant air, it will not be necessary to disclose these in detail herein. Additionally, pneumatic and electronic arrangements are well known and available for synchronizing in any desired ratio the movement of the conveyor, the rotation of the exit tube and velocity of the fluid medium. Accordingly, these will not be illustrated or described.

In one form of carrying out the present invention, the fluid medium may comprise air containing suspended droplets or a mist of a size material, particularly where the strand, yarn or cord is formed of an assembly of glass subelements. Alternatively, it is frequently more desirable to apply the appropriate size material onto the deposited strand via the conduit and nozzle 126 illustrated. The size, as will be described later herein, may serve several purposes. One is the protecting of the glass filaments making up the strand or cord. Another is to provide a bonding effect to the filaments, lending to the mat, when deposited thereon, an integrity whereby the mat can be handled without falling apart.

In accordance with the present invention, it is also possible to apply a size to the strand in the manner illustrated in FIG. 6, that is, carried by the air medium introduced through the lateral inlet tube 120, while the conduit nozzle arrangement 126 is employed to spray upon the looped strand material an elastomeric impregnant material having a composition as described subsequently herein.

In certain cases, it is most desirable that the strand 110 introduced to the overhead dispenser 102 already bears a size material and possibly even an impregnant. It is further envisioned that the conveyor 100 can bear a thin calendered sheet of rubber upon which the strand or cord material is deposited in the series of overlapping loops as described. Thereafter, the rubber sheet bearing the strand material thereon in the series of loops is combined with another calendered sheet of rubber to produce an elongate sheet having a sandwich structure composed of outer calendered sheets or rubber and therebetween the layer of reinforcement strand or cord in the looped configuration shown. This structure is illustrated in FIG. 7 wherein the reference numeral 130 designates a lower sheet of rubber. Reference numeral 110 identifies the strand or cord in continuous looped configuration, while the reference numeral 132 identifies the upper sheet of vulcanizable elastomeric rubber material.

It will be appreciated that, for purposes of clarity of illustration, the series of loops are shown with a greater spacing between the repeating loop than is present in actual practice. A closer spacing in the drawings would obscure the pattern of the repeated loops. Usually, the cord spacing is much closer, ranging from contacting relationship to just slightly spaced relationship with the previous course of the strand or cord. At the same time, it is frequently desirable to have the cord spaced from a half to a full cord thickness from the previously deposited course.

Reference numeral 140 (FIG. 7) identifies a line which constitutes the longitudinal centerline of the continuous sheet construction. At the same time, the character of the loop described by the deposited strand or cord is such that this same line is the situs of the plurality of minor axis of the plurality of overlapping loops. With this arrangement, it will be further appreciated that the major axis of the plurality of loops is transverse to the longitudinal axis 140 and extends from one lateral edge 141 to the other lateral edge 142 of the elongate sheet structure. The elongate sheet generally identified by reference numeral 145 may be bias cut into appropriate lengths to form a carcass ply in the manner of the sheet illustrated in FIGS. 3 and 4. Once so cut, the significance of the notations "side wall region, tread region and side wall region" above the elongate sheet in FIG. 7 will be appreciated as will the significance of the lines 146, 147 and 148. Line 146 coincides generally with the slope of the segment of the loops within the tread region. Line 147 coincides generally with the slope of the segment of the cord or strand in the loop region falling within the side wall region on the left of FIG. 7. Similarly, line 148 coincides with the average slope of that segment of the loops which lies in the side wall region on the right of FIG. 7. Edges 141 and 145 constitute the bead forming edge of the carcass ply. Line 140, hereinabove identified as the longitudinal axis of the sheet, also conforms to the peripheral centerline of the tire constructed employing the carcass ply in accordance with the structure of FIG. 7. It may be noted that the slope of the line 146 is essentially normal to the line 140 corresponding to the peripheral centerline. Thus, the angle of the reinforcement strand or cord 110 is essentially radial in the tread region, whereas the angle of the cord in the side wall regions is bias inclined. The inclination of the segments as designated by the lines 147 and 148 are generally equal and opposite. The carcass ply having a construction as illustrated in FIG. 7 is thus generally similar, in terms of the inclination of the cords in the side wall regions and the tread region, to the carcass ply structure illustrated in FIG. 3.

An elongate sheet including a flat "helix-like" disposition of continuous yarn or cord in the form of a series of repeating loops therein may also be produced by first laying down a deposition of the yarn or cord in looped disposition upon a suitable conveyor as shown in FIG. 6, preferably including a size and impregnant, followed by a passage of the so-formed mat through a four-roll rubber calender to produce a calendered sheet having the spiral cord mat, as described, incorporated therein. It may be desirable prior to calendering to pass the looped strand mat through a heating oven to effect some securement of the looped yarn at the strand or cord crossover points to thereby increase the structural integrity of the mat for passage through the calendering operation. It will be appreciated that increasing the speed of the conveyor, all else remaining constant, will elongate the dimension of the loops in the direction of conveyor movement as illustrated. In this regard, reference to FIGS. 6 and 7 in combination reveals that the minor axis of the loops (coincident with the direction of movement of conveyor 100) in the mat illustrated in FIG. 6 is less than the minor axis of the loops of the mat illustrated in FIG. 7. Thus, the latter is representative of either a higher conveyor speed or a lower speed of angular rotation of the dispenser tube 116 and the propellant air introduced through the lateral tube 120.

From the foregoing description in conjunction with FIGS. 6 and 7, it will be appreciated that there is provided an extremely convenient technique for producing a continuous sheet in the form of a mat or in the form of a vulcanizable elastomeric sheet containing an interior cord reinforcement; all of which structures are of utility in producing a carcass ply for tires. The disposition of the reinforcement cords in terms of the angle in the several regions of the carcass may be easily changed to meet the particular requirement of the ultimate tire. In some cases, a rather acute bias angle in the side wall region of the carcass would be most beneficial while, in other cases, a more obtuse angle of the reinforcement cord in the side wall region would be most desirable.

In some circumstances, it may be desirable to sever the lateral edges 141 and 142 of the elongate sheet in the course of bias cutting the sheet into carcass configuration. Thus, it will be appreciated that with the repeated looping as described, the strand concentration is greatest at the lateral edges of the sheet in FIG. 7. In some cases, this will not be objectionable since the buildup, due to the concentration and overlapping in this region, will provide bulk (increased thickness) to the carcass sheet in the ultimate bead region of the tire. On the other hand, in certain constructions, this concentration would not be desirable. Accordingly, as indicated, it may be desirable to sever this edge so as to remove from ⅛ to ⅜ of an inch on each side. The bias cut carcass sheet, even with the edges removed, will retain the advantage inherent in the variable angles in the tread and side wall regions as described earlier herein.

Figure 8:
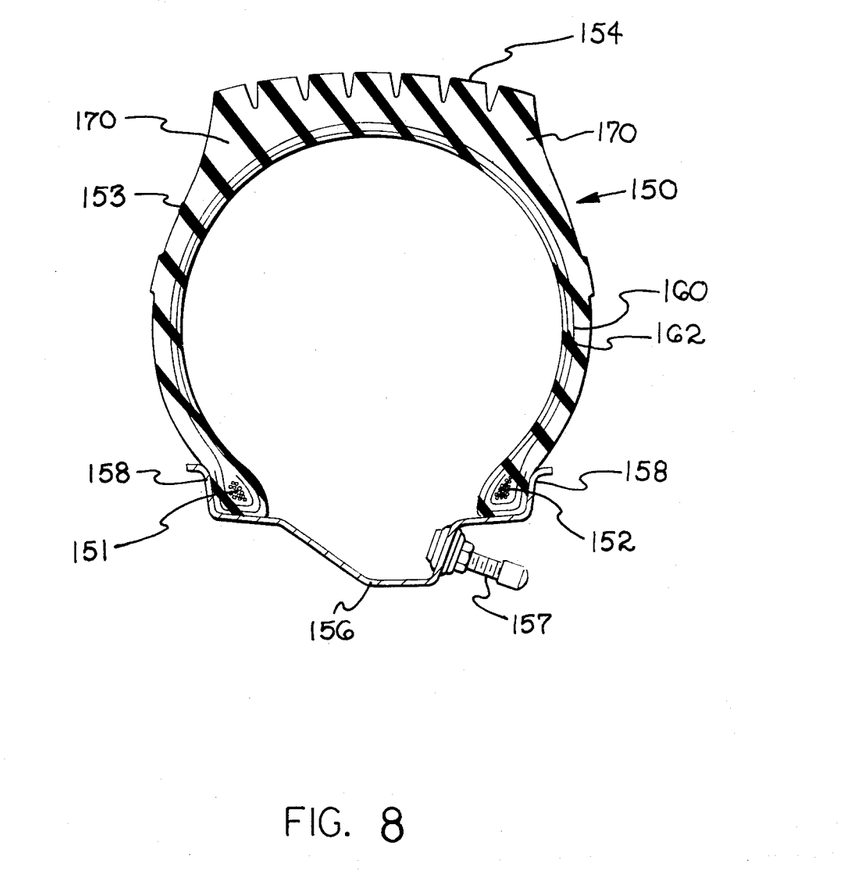
FIG. 8 is a sectional view of a tire construction including carcass plies formed of the sheet material according to FIGS. 6 and 7.

In FIG. 8, there is disclosed a tire 150 inclusive of spaced beads 151 and 152 joined by a connecting carcass 153 and having at the crown thereof a tread 154. The tire as shown is mounted in a rim 156, fitted with a valve and stem arrangement 157 for admission of inflating air to maintain the tire in inflated condition and the beads secured against the flange portions 158 of the rim. In accordance with a preferred embodiment of the present invention, the carcass of the tire includes two carcass plies 160 and 162 which extend from bead to bead with appropriate lateral edges wrapped around the bead in conventional fashion. The carcass plies are preferably formed of a sheet or a segment of the length of elongate sheet material illustrated in FIG. 7 with the ends bias cut and arranged in end-to-end relationship in conventional fashion as followed in the flat band technique of tire manufacture. Since the flat band method and, as well, apparatus involved in the performance or practice of the method are well known, the actual manufacturing operation for the production of a tire need not be described or illustrated, particularly since the method and apparatus of tire manufacture form no part of the present invention.

Referring to FIGS. 7 and 8 together, it will be appreciated that the carcass ply in the finished tire will have the tread region of the bias cut elongate sheet of FIG. 7 located in the tread region of the tire, by which is meant the region extending generally from shoulder to shoulder; the shoulder being identified by the reference numeral 170. Similarly, the side wall region is generally that extending from the shoulder down to the bead. This region has been identified in the plan view of the elongate sheet in FIG. 7. Comparing the two, it can be seen that the segment of the loop in the tread region will be approaching a line normal to the peripheral centerline of the tire while in the side wall regions, the segment of the loop therein will be inclined at an angle or, in other words, be a bias inclination. In such a disposition, the cord will extend, viewing the tire in side elevation, from the shoulder at an angle down to the bead region. A tire so constructed will thus be characterized by a carcass of one or more carcass plies in which the cord may be described as a radial cord in the tread region and a bias cord disposition in the side wall regions. It will be further appreciated that tires featuring carcass plies in accordance with the present invention may further include belt plies, breaker strips, etc.

The effectiveness of the glass as a reinforcement in the manner described herein is enhanced by treating the glass before it is incorporated into the rubber matrix. This treatment generally is two-fold. First, the individual filaments are desirably treated with a liquid anchoring material and, secondly, the multifilament strands or cords are desirably impregnated with an elastomeric material. The treatment of the individual filaments with a liquid anchoring agent is per-formed as individual filaments are collectively drawn from a multi-orifice platinum "bushing" containing the molten glass from which they are formed. Thus, the individual filaments numbering anywhere from several hundred to several thousand are drawn from a plurality of orifices contained in the bottom wall of the platinum "bushing" containing the molten glass. The filaments are pulled by a winder situated below which attenuates the glass emanating from the orifices into an extremely fine diameter. The plurality of filaments are then drawn together into a common stand and wound on the spool. As they are drawn together, they are sprayed with a liquid composition containing an anchoring agent, for example, an amino silane, such as gamma-propyltriethoxy silane; a mercapto substituted organoalkoxy silane; a glycidox silane, such as gamma-glycidoxypropyltrimethoxy silane; or a carboxyl group and/or unsaturated group containing silane, such as gamma-methacryloxypropyltrimethoxy silane. A Werner type compound complexed to contain an amino, a carboxyl or other active hydrogen containing organic group may be used as the anchoring agent. A typical size treatment composition for the glass filaments is composed of 0.5 – 2.0 percent by weight of gamma-aminopropyltriethoxy silane, 0.3 – 0.6 percent by weight of a lubricant and the remainder water. Such as strand contained on the package is usually combined with a plurality of like strands to form a ultimate yarn or cord suitable for use in the present invention.

The second treatment desirably given the strands or cords involves an immersion of the continuous strand or cord in a bath containing a suitable impregnant which is within a range of viscosity as will allow or favor penetration of the liquid impregnant into the strand or cord in only a limited time of immersion. A suitable impregnant for use in either of these application stations is composed of 60 – 40 parts by weight of a 38 percent dispersed solids system including a butadiene-styrene-vinyl pyridine terpolymer latex, a butadiene styrene latex and a resorcinol-formaldehyde resin; all dispersed in 39 parts by weight of water. A commercially available product which has been employed as an impregnant bath in treating glass yarn and cord materials is marketed by Uniroyal under the trade name "LOTOL 5440". The continuous yarn or strand of glass bearing the impregnant is preferably then dried in an oven, or by other suitable arrangements, to achieve a partial vulcanization and at the same time reducing the tackiness. Usually, a temperature of from 750° to 1100° F. suffices for this purpose. The cords, of which the novel carcass ply and tire constructions in accordance with the present invention are formed, may include, in addition to glass filaments, a combined amount of an organic component. Also, a composite cord construction may feature an organic core component and a surrounding overwrap, usually spiral, of a glass strand or yarn component. Cord constructions of this type as candidate tire carcass cord members are disclosed in application Ser. Nos. 664,020 filed Aug. 29, 1967; 730,139 filed May 17, 1968; and 721,688 filed Apr. 16, 1968; which applications are assigned to the same assignee as the present application.

It will further be appreciated that carcass ply structures and tires as described herein, namely, featuring differing angles in different segments of the ply and/or tire, may be used in combination with conventional bias ply carcass members or in combination with radial type carcasses employed in the radial tire.

It will be appreciated from the foregoing that a variety of modifications are possible within the broad framework of the disclosure presented hereinabove. Accordingly, it is intended to include all such obvious modifications, substitutions and equivalents unless expressly violative of the appended claims.

I claim:

1. A tire construction comprising a pair of spaced wheel rim attachment means, a connected carcass extending toroidally between said spaced means and a tread carried at the crown of said carcass between shoulder regions, said carcass including a ply including a plurality of side-by-side, substantially inextensible cords, said cords proceeding from one of said spaced attachment means at a bias angle up to the adjacent shoulder region of said carcass, then across said crown to the other shoulder in a path generally normal to the peripheral centerline of said tire, thence at a bias angle to the other of said spaced attachment means.

2. A tire construction as claimed in claim 1, wherein the bias angles defined by said cords between said spaced attachment means and the adjacent shoulder region are equal.

3. A tire construction as claimed in claim 2, wherein said bias angles are inclined in opposite directions.

4. A tire construction as claimed in claim 1, wherein said cords are formed of a plurality of continuous glass filaments.

5. A tire construction as claimed in claim 4, wherein said cords include an elastomeric impregnant.

6. A tire construction as claimed in claim 3, wherein said cords are formed of a plurality of continuous glass filaments.

7. A tire construction as claimed in claim 6, wherein said cords include an elastomeric impregnant.

8. A tire construction as claimed in claim 1, wherein said tire includes a second ply including a plurality of side-by-side, substantially inextensible cords, and wherein said individual cords in each of said plies in proceeding from bead to bead define a path which falls in a single plane.

9. A tire construction as claimed in claim 1, wherein said tire includes a second ply including a plurality of side-by-side, substantially inextensible cords, and wherein said individual cords in each of said plies extend at one angle in one side wall region and at an equal opposite angle in the opposite side wall.

* * * * *